(12) United States Patent
Laudel et al.

(10) Patent No.: US 8,842,790 B2
(45) Date of Patent: Sep. 23, 2014

(54) METHODS AND SYSTEMS TO SYNCHRONIZE NETWORK NODES

(75) Inventors: Kennan Laudel, San Jose, CA (US);
Baohong Liu, Cupertino, CA (US);
Sowmiya Narasimhan, Milpitas, CA (US); Sigang Qiu, Sunnyvale, CA (US);
Yongfang Guo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1168 days.

(21) Appl. No.: 12/645,250

(22) Filed: Dec. 22, 2009

(65) Prior Publication Data
US 2011/0150160 A1   Jun. 23, 2011

(51) Int. Cl.
*H03K 9/02* (2006.01)
*H04L 7/04* (2006.01)
*H04L 27/26* (2006.01)

(52) U.S. Cl.
CPC ............ *H04L 7/041* (2013.01); *H04L 27/2657* (2013.01)
USPC ............................ 375/354; 455/502; 375/267

(58) Field of Classification Search
USPC ........... 375/354, 371, 375, 260, 267; 455/502
See application file for complete search history.

(56) References Cited

U.S. PATENT DOCUMENTS

| | | | | |
|---|---|---|---|---|
| 2005/0089127 A1* | 4/2005 | Nagaraja | ...................... | 375/354 |
| 2006/0239393 A1* | 10/2006 | Lai et al. | ...................... | 375/376 |
| 2008/0130779 A1* | 6/2008 | Levi et al. | ...................... | 375/267 |
| 2008/0291893 A1* | 11/2008 | Yang et al. | ...................... | 370/350 |
| 2010/0098110 A1* | 4/2010 | Mueller | ...................... | 370/503 |
| 2012/0005517 A1* | 1/2012 | Foster et al. | ................. | 713/500 |

* cited by examiner

*Primary Examiner* — Chieh M Fan
*Assistant Examiner* — Freshteh N Aghdam
(74) *Attorney, Agent, or Firm* — Garrett IP, LLC

(57) ABSTRACT

Methods and systems to synchronize to a remote node counting rate, symbol rate, and carrier frequency as functions of an estimated frequency offset and relationships between the remote node carrier frequency and counting rate, and between the remote node carrier frequency and symbol rate. The carrier frequency offset may be scaled in accordance with a ratio between the carrier frequency and the remote counting rate to synchronize the local counting rate with the remote counting rate, and/or scaled in accordance with a relationship between the carrier frequency and the remote symbol rate to synchronize the local receive path and/or transmit path sample rate with the remote symbol rate. The carrier frequency offset may be applied as compensation in the receive path and/or the transmit path. The remote and local nodes may correspond to a network coordinator and an existing node, respectively, in a Multimedia Over Coax (MoCA) environment.

13 Claims, 8 Drawing Sheets

METHODS AND SYSTEMS TO SYNCHRONIZE NETWORK NODES

BACKGROUND

In a multi-node communication network, synchronization may be employed to coordinate transmissions amongst the nodes. Synchronization may be implemented with respect to carrier frequencies, symbol or sample timing rates, and time stamp clocks.

Nodes within a multi-node communication network may be configured to comply with one or more synchronization standards. For example, a Multimedia Over Coaxial Cable Alliance (MoCA), (http://www.mocalliance.org), develops standards for networking over coaxial cable. Existing MoCA standards include MoCA 1.0 and MoCA 1.1, released together referred to herein as MoCA 1.X. A MoCA 2.0 standard is currently under development.

A multi-node communication network may include a management node and one or more client nodes. In a MoCA environment, management nodes are referred to network coordinators (NCs), and client nodes are referred to as existing nodes (ENs). For illustrative purposes, this terminology is used herein.

A NC may utilize a time stamp clock to schedule events and communication bandwidth amongst ENs. The ENs may maintain corresponding time stamp clocks to perform in accordance with scheduled events.

The NC may send a time stamp, or current count of the network coordinator time stamp clock, to an EN to synchronize the current count of the EN time stamp clock to the current count of the NC time stamp clock.

The NC time stamp clock and the EN time stamp clock are each driven by corresponding clock signals or counting rates. Where a counting rate of the EN time stamp clock is not synchronized to a counting rate of the NC time stamp clock, the current count of the EN time stamp clock may drift from the current count of the NC time stamp clock.

MoCA 1.X and MoCA 2.0 include specifications for a NC to provide a current count or time stamp to an EN. Time stamps may be provided to an EN when the EN initially connects to the network. Subsequent time stamps may be provided in beacons sent from the NC to schedule events or communication bandwidth.

In order to increase capabilities within a network and provide more efficient use of communication bandwidth, MoCA 2.0 adds new synchronization specifications and reduces tolerances of some existing synchronization specifications. For example, under MoCA 2.0, multiple ENs concurrently transmit reservation requests to a NC in an OFDMA mode. Multiple ENs may simultaneously transmit physical layer or PHY-frames, with each EN utilizing a corresponding NC-assigned subset of sub-carriers. The OFDMA PHY-frames may include reservation requests and/or other information directed to the NC, effectively providing a multipoint-to-point transmission. The NC may receive what appears as a single PHY-frame, a payload of which may be de-multiplexed for recovery. To maintain orthogonality of the combination of sub-carriers transmitted from multiple ENs, EN OFDMA transmitters are to synchronize corresponding sub-carriers to corresponding sub-carriers of the NC, adjust corresponding transmissions to arrive simultaneously at the NC, and adjust amplitudes of the corresponding transmissions as specified by the NC.

Under MoCA 1.X, an EN is to synchronize a local time stamp count to the NC time stamp count within 2.2 micro seconds (µs).

Under MoCA 2.0, an EN is to synchronize the local time stamp count to the NC time stamp count within 0.1 µs, with a counting rate accuracy of +/−20 parts per million (ppm). MoCA 2.0 provides a ranging mechanism to determine a time delay between an EN and a NC, and to use the time delay to provide a more accurate time stamp to the EN.

Under MoCA 1.X, an EN transmitter is to maintain a carrier frequency within +/−100 ppm of the NC carrier frequency.

Under MoCA 2.0, an EN is to synchronize a transmit carrier frequency to within +/−1 kHz of the NC carrier frequency. For a carrier frequency of approximately 1.5 GHz, this correlates to approximately 0.7 ppm.

Under one proposed MoCA 2.0 specification, for any given node, a transmitter symbol clock and a transmitter carrier frequency are to be derived from a common reference frequency.

Under the aforementioned MoCA 2.0 specification, a counting rate of a NC time stamp clock, and a frequency of a NC transmit carrier signal, are to be derived from a common reference frequency.

BRIEF DESCRIPTION OF THE DRAWINGS/FIGURES

Figure 1:
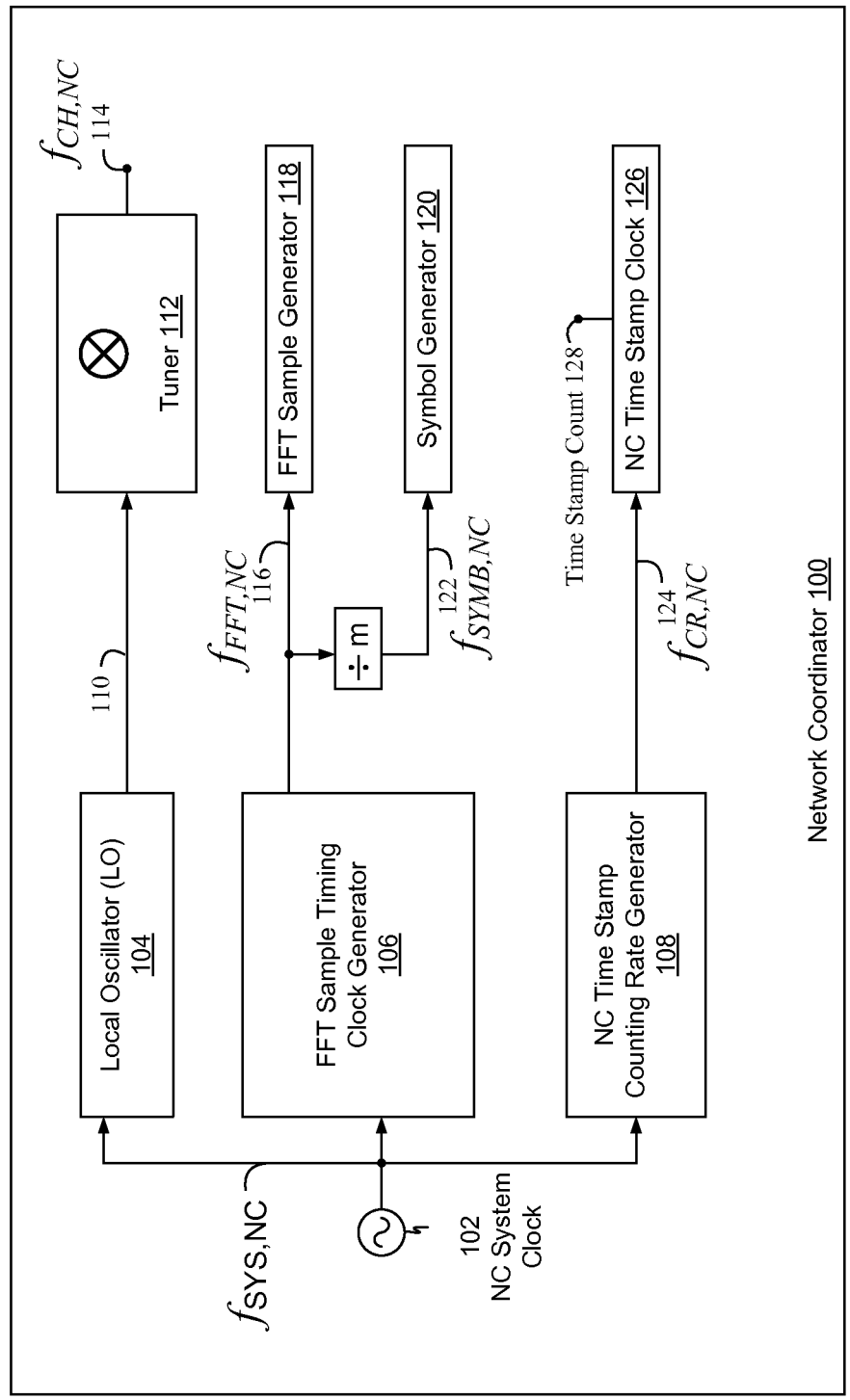
FIG. 1 is a block diagram of a management node, or network coordinator (NC).

In the drawings, the leftmost digit(s) of a reference number identifies the drawing in which the reference number first appears.

DETAILED DESCRIPTION

Disclosed herein are methods and systems to synchronize nodes of a communication network, including to synchronize a time stamp clock counting rate, a symbol or sample rate, and a carrier frequency, in response to an estimated carrier frequency offset.

The carrier frequency offset may be scaled in accordance with a relationship between the carrier frequency and a nominal remote counting rate to synchronize a local counting rate with the remote counting rate. The scaling may be applied to a clock generator driven by a local clock.

The carrier frequency offset may be scaled in accordance with a relationship between the carrier frequency and a nominal remote symbol/Fast Fourier Transfer (FFT) sample rate to synchronize a local sample rate with the remote symbol rate. The scaling may be applied as compensation in a receive path and/or a transmit path.

The carrier frequency offset may be applied as compensation in the receive path and/or the transmit path, such as to shift a carrier frequency by the carrier frequency offset.

For illustrative purposes, management nodes are referred to herein as network coordinators (NCs), and client nodes are referred to as existing nodes (ENs), such as used in MoCA environments. Methods and systems disclosed herein are not, however, limited to MoCA environments.

FIG. 1 is a block diagram of a portion of a NC 100, including a reference clock 102 to provide a reference or system frequency $f_{SYS,NC}$, to each of a local oscillator (LO) 104, a FFT sample timing clock generator 106, and a time stamp counting rate generator 108.

LO 104 is configured to generate a LO frequency 110 from system frequency $f_{SYS,NC}$, and to provide LO frequency 110 to a tuner 112. Tuner 112 may include a frequency up-converter to frequency up-convert one or more baseband or relatively low intermediate frequency signals to one or more carrier signals 114. The one or more carrier signals 114 may include a plurality of sub-carriers, such as in an orthogonal frequency-division multiple-access (OFDMA) environment. The one or more carrier signals 114 may include a carrier frequency $f_{CH,NC}$.

FFT sample timing clock generator 106 is configured to generate an FFT sample timing clock signal 116, having a frequency $f_{FFT,NC}$, from system frequency $f_{SYS,NC}$, and to provide clock signal 116 to a FFT sample generator 118.

NC 100 may include a symbol generator 120, and may be configured to generate a corresponding symbol timing clock 122, having a frequency $f_{SYMB,NC}$, from FFT sample timing clock 116.

Time stamp counting rate generator 108 is configured to generate a time stamp counting rate signal 124, having frequency or counting rate $f_{CR,NC}$, from system frequency $f_{SYS,NC}$, and to provide time stamp counting rate signal 124 to a time stamp clock 126.

Time stamp clock 126 may be configured to maintain a time stamp count 128 to schedule events and permissions with respect to one or more ENs.

Where clock signals 110, 116, 122, and 124 are generated, directly or indirectly from system clock 102, frequencies of the clock signals may be linearly related, such as illustrated in equations 1 through 4 below, where k, l, m, and n are positive real numbers:

$$f_{CH,NC} = k \cdot f_{SYS,NC} \quad \text{(Eq. 1)}$$

$$f_{CH,NC} = l \cdot f_{FFT,NC} \quad \text{(Eq. 2)}$$

$$f_{FFT,NC} = m \cdot f_{SYMB,NC} \quad \text{(Eq. 3)}$$

$$f_{CH,NC} = n \cdot f_{CR,NC} \quad \text{(Eq. 4)}$$

In equations 1-4, k, l, m, and n are positive real numbers. In a MoCA 1.x environment, m may be equal to 256. In a MoCA 2.0 environment, m may be equal to 512.

Figure 2:
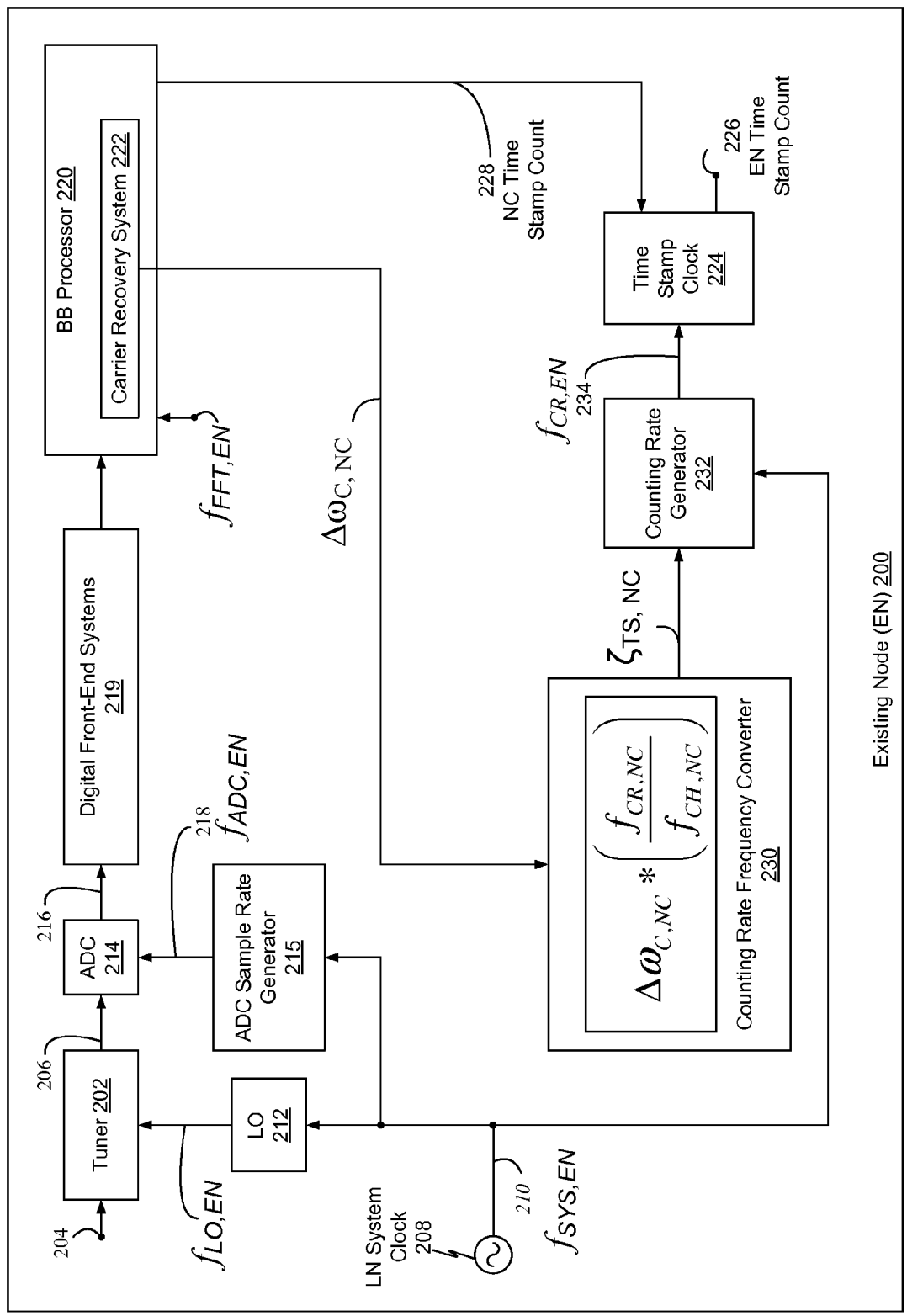
FIG. 2 is a block diagram of a client node, or existing node (EN) in MoCA terminology, configured to synchronize a counting rate of a time stamp clock with a NC counting rate, as a function of an estimated carrier frequency offset and a relationship between a NC carrier frequency and counting rate.

FIG. 2 is a block diagram of a portion of an existing node (EN) 200.

EN 200 includes a tuner 202 to receive a signal 204. Signal 204 may correspond to signal 114 in FIG. 1, and/or to signals from other ENs. EN 200 may be configured to receive signal 204 over one or more of cable and air.

Tuner 202 may be configured to frequency down-convert received signal 204 to a signal 206, which may correspond to an intermediate frequency (IF) signal, a relatively low IF signal, and/or a baseband signal.

EN 200 includes a system clock 208 to generate a system clock 210 having a frequency $f_{SYS,EN}$, and may include a local oscillator (LO) 212 to generate a LO frequency $f_{LO,EN}$, from system clock 210.

Tuner 202 may be configured to frequency down-convert signal 204 in response to a LO frequency $f_{LO,EN}$. Tuner 202 may include a direct or single stage down-converter, and LO generator 212 may be configured to generate LO frequency $f_{LO,EN}$ at a frequency nominally equal to NC carrier frequency $f_{CH,NC}$ in FIG. 1.

EN 200 may include an analog-to-digital converter (ADC) 214 to digitize signal 206 to a digitized signal 216. ADC 214 may receive system clock 210, or a clock generated therefrom. For example, EN 200 may include an ADC sample rate generator 215 to generate a sample clock 218 having a frequency $f_{ADC,EN}$.

EN 200 may include one or more digital front end systems 219, which may include, without limitation, one or more of filters and radio frequency (RF) compensation systems.

EN 200 may include a baseband processor 220, which may include, without limitation a carrier recovery system 222 to determine or estimate a carrier frequent offset between frequency $f_{LO,EN}$ and a carrier frequency of received signal 204. In FIG. 2, the carrier frequency offset is illustrated as $\Delta\omega_{C,NC}$ to indicate that estimated frequency corresponds to NC carrier frequency $f_{CH,NC}$ in FIG. 1. Methods and systems to estimate carrier frequency offset $\Delta\omega_{C,NC}$ are disclosed below with respect to FIG. 3.

EN 200 may include a time stamp clock 224 to maintain a time stamp count 226, such as to handle events and permissions scheduled by NC 100. EN 200 may be configured to extract a time stamp count 228 from a signal received from NC 100, and to update or synchronize time stamp count 226 with time stamp count 228.

EN 200 further includes a counting rate frequency converter 230 to convert or scale frequency offset $\Delta\omega_{C,NC}$ in accordance with a nominal relationship between nominal NC carrier frequency $f_{CH,NC}$ and NC nominal counting rate $f_{CR,NC}$ in FIG. 1, where nominal refers to specified values, not necessarily actual or measured values.

Frequency converter 230 may be configured to determine a counting rate compensation factor $\zeta_{TS,NC}$, as:

$$\zeta_{TS,NC} = \Delta\omega_{C,NC} * \left(\frac{f_{CR,NC}}{f_{CH,NC}}\right) \quad \text{(Eq. 5)}$$

$\zeta_{TS,NC}$ may represent a measured error in a ratio of NC counting rate $f_{CR,NC}$ and EN system frequency $f_{SYS,EN}$.

EN 200 further includes a counting rate generator 232 to generate a counting rate signal 234, having a frequency or counting rate $f_{CR,EN}$, from a combination of system frequency $f_{SYS,EN}$ and counting rate compensation factor $\zeta_{TS,NC}$.

Counting rate generator 232 may include a counter to increment at system frequency $f_{SYS,EN}$, in steps defined by counting rate compensation factor $\zeta_{TS,NC}$, and to output a count overflow as counting rate $f_{CR,EN}$. The counter may include a phase accumulator. The overflow may serve as an estimate of counting rate $f_{CR,NC}$.

As described below with respect to FIG. 3, in a MoCA environment, $\Delta\omega_{C,NC}$ may be derived from NC transmissions, such as beacons and/or media access packets (MAPs). NC 100 may transmit beacons at intervals of approximately 10 milliseconds (ms), and MAPs at intervals of approximately 2 ms. Synchronization of EN counting rate $f_{CR,EN}$ based on beacons and/or MAPs received at such intervals may reduce a drift of EN time stamp count 226 to within 0.1 µs or less of NC time stamp count 128, with a counting rate synchronization accuracy of approximately ±20 ppm or less relative to NC counting rate $f_{CR,NC}$.

Methods and systems to synchronize a carrier frequency of digitized signal 216 in FIG. 2 to NC carrier frequency $f_{CH,NC}$ in FIG. 1, and to synchronize a sample rate of digitized signal 216 in FIG. 1 with NC symbol rate $f_{SYMB,NC}$ and NC FFT sample rate $f_{FFT,NC}$ in FIG. 1, are now disclosed.

Figure 3:
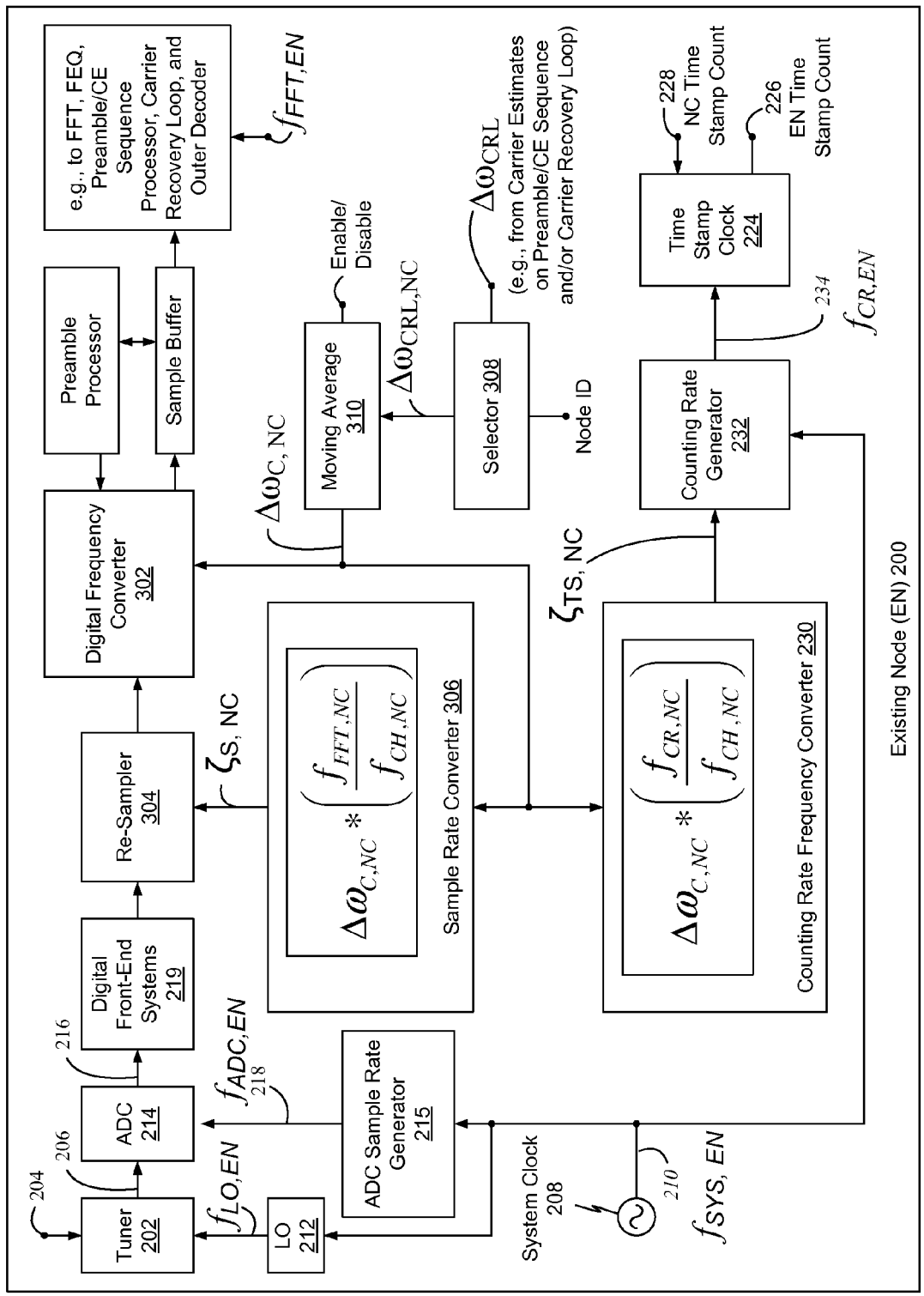
FIG. 3 is a block diagram of the EN, further configured to synchronize a sample rate of a received signal as a function of the estimated carrier frequency offset and a relationship between the carrier frequency and a symbol rate of the NC, and to synchronize a frequency of the received signal in response to the estimated carrier frequency offset.

FIG. 3 is a block diagram of EN 200, further including a digital frequency converter (DFC) 302 to frequency shift digitized signal 216 in accordance with carrier frequency offset $\Delta\omega_{C,NC}$. The frequency shift may reduce carrier frequency offset in digitized signal 216 imparted by tuner 202, and may center digitized signal 216 about 0 Hz or at baseband, to effectively synchronize the carrier frequency of digitized signal 216 in FIG. 2 to NC carrier frequency $f_{CH,NC}$ in FIG. 1.

Regarding symbol rate, where EN FFT sample rate $f_{FFT,EN}$ in FIG. 2 is not synchronous with NC FFT sample rate $f_{FFT,NC}$ in FIG. 1, a sample rate of digitized signal 216 in FIG. 2 may not be synchronous with NC symbol rate $f_{SYMB,NC}$ in FIG. 1.

In FIG. 1, carrier frequency $f_{CH,NC}$ and FFT sample rate $f_{FFT,NC}$ are generated from a common reference frequency, $f_{SYS,NC}$, as specified in MoCA 2.0. Estimated carrier frequency offset $\Delta\omega_{C,NC}$ in FIG. 2 is thus frequency related to NC FFT sample rate $f_{FFT,NC}$, and may be used to synchronize EN FFT sample rate $f_{FFT,EN}$ to NC FFT sample rate $f_{FFT,NC}$.

In FIG. 3, EN 200 may include a symbol re-timing system, illustrated here as a re-sampler 304, to synchronize the sample rate of digitized signal 216 with NC FFT sample rate $f_{FFT,NC}$.

EN 200 may further include a sample rate converter 306 to convert or scale carrier frequency offset $\Delta\omega_{C,NC}$ in accordance with the frequency relationship between carrier frequency $f_{CH,NC}$ and NC FFT sample rate $f_{FFT,NC}$. Converter 306 may be configured to determine a sample rate compensation factor, $\zeta_{S,NC}$, as:

$$\zeta_{S,NC} = \Delta\omega_{C,NC} * \left(\frac{f_{FFT,NC}}{f_{CH,NC}}\right) \quad \text{(Eq. 6)}$$

Sample rate compensation factor $\zeta_{S,NC}$ may represent an error in a ratio of NC carrier frequency $f_{CH,NC}$ and EN sample rate $f_{FFT,EN}$. Sample rate compensation factor $\zeta_{S,NC}$ may compensate digitized signal 216 for a difference between NC FFT sample rate $f_{FFT,NC}$ and EN sample rate $f_{FFT,EN}$, and may control re-sampler 304 to translate digitized signal 216 from a sample domain of EN ADC 214, to a sample rate domain of NC 100.

Digital frequency converter 302 may be implemented in one or more of a variety of positions within a digital portion of a receive path.

Estimation of carrier frequency offset $\Delta\omega_{C,NC}$ is now described.

In FIG. 3, EN 200 may be configured to generate or estimate a carrier frequency offset $\Delta\omega_{CRL}$ with respect to signals received from a plurality of transmitters, including NC 100 and other ENs. EN 200 may include a selector 308 to filter estimates from $\Delta\omega_{CRL}$ that are not associated with transmissions from NC 100, and to output NC-specific carrier frequency offsets as $\Delta\omega_{C,NC}$.

Carrier frequency offsets $\Delta\omega_{CRL}$ may be determined using a carrier recovery loop, and/or a preamble/channel estimate (CE) sequence processor to evaluate CE preamble sequences, such as in a MoCA environment. A CE preamble processor may be configured to estimate a residual carrier frequency offset by correlation, which may be combined with a carrier recovery loop estimate to produce $\Delta\omega_{CRL}$. In a MoCA environment, carrier frequency offsets $\Delta\omega_{CRL}$ may be based, at least in part, on beacons and/or media access packets received periodically from NC 100, such as described above.

Carrier frequency offsets $\Delta\omega_{CRL}$ may correspond to a previous frame. Carrier frequency offsets generated by a carrier recovery loop may be averaged over previous frames.

EN 200 may include a moving average module 310 to output $\Delta\omega_{C,NC}$ as a moving average, based on new and previous carrier frequency offset estimates of $\Delta\omega_{CRL,NC}$.

Methods and system to synchronize an EN transmit carrier frequency, and to synchronize an EN transmit sample rate, are now described.

One or more of carrier frequency offset $\Delta\omega_{C,NC}$ and symbol rate compensation factor $\zeta_{S,NC}$ may be determined as described above, and utilized in an EN transmit path, such as disclosed below with respect to FIG. 4.

Figure 4:
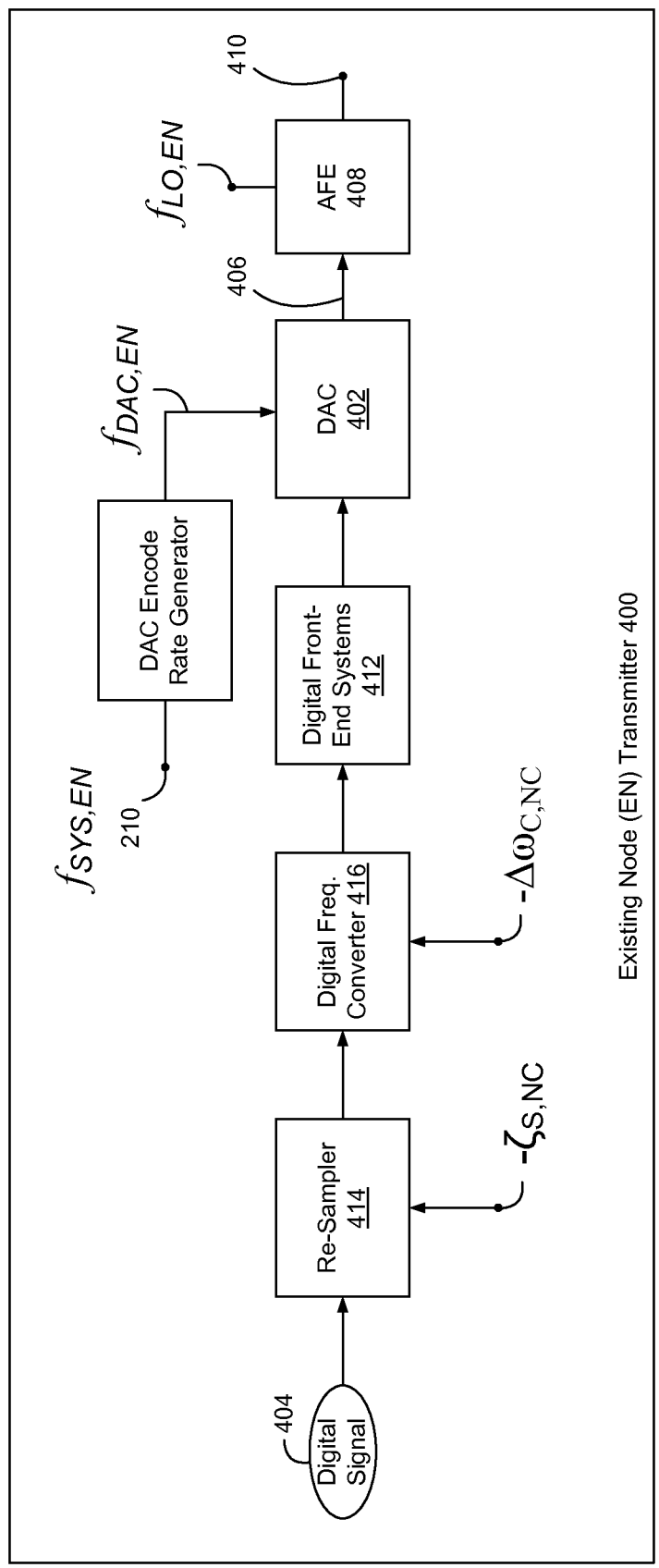
FIG. 4 is a block diagram of an EN transmit path, configured to synchronize a transmit symbol/IFFT rate in accordance with a function of the estimated carrier frequency offset and a relationship between the NC carrier frequency and symbol/IFFT rate, and to synchronize a transmit carrier frequency in response to the estimated carrier frequency offset.

FIG. 4 is a block diagram of an EN transmitter 400, which may be implemented as part of EN 200 as illustrated in one or more of FIGS. 2 and 3.

EN transmitter 400 includes a digital-to-analog converter (DAC) 402 to convert a digital signal 404 to an analog signal 406, responsive to a frequency $f_{DAC,EN}$ that is generated from system frequency $f_{SYS,EN}$.

EN transmitter 400 further includes an analog front end (AFE) 408, which may include a tuner to frequency up-convert analog signal 406 to a signal 410 for transmission to NC 100 and/or to another EN. The tuner may frequency up-convert analog signal 406 in response to EN LO frequency $f_{LO,EN}$.

EN transmitter 400 may include one or more digital front end systems 412, which may include, without limitation, one or more of filters and radio frequency (RF) compensation systems, to pre-compensate digital signal 404.

As described above, NC carrier frequency $f_{CH,NC}$ and NC FFT timing frequency $f_{FFT,NC}$ in FIG. 1 are related to one another. Estimated carrier frequency offset $\Delta\omega_{C,NC}$ in FIG. 2 is thus related to NC FFT rate $f_{FFT,NC}$, and may thus be used to pre-compensate digital signal 404 so that the FFT sample rate imparted to digital signal 404 at DAC 402 is synchronous with NC FFT sample rate $f_{FFT,NC}$, and so that the carrier frequency imparted to signal 410 by AFE 408 is synchronous with NC carrier frequency $f_{CH,NC}$.

In FIG. 4, EN transmitter 400 may include a sample rate pre-compensator, illustrated here as a re-sampler 414, to re-time or re-sample digital signal 404 in accordance with sample rate compensation factor $\zeta_{S,NC}$, such that the sample rate imparted by DAC 402 is synchronized with NC FFT rate $f_{FFT,NC}$. Re-sampler 414 may be configured similar to re-sampler 304 in FIG. 3.

Where FFT sample rate compensation factor $\zeta_{S,NC}$ is determined with respect to a received signal, such as described above with respect to FIG. 3, the effect of FFT sample rate compensation factor $\zeta_{S,NC}$ may be reversed in a transmit path. For example, re-sampler 414 may re-sample based on a difference frequency $f_{DIFF}$ corresponding to FFT sample rate compensation factor $\zeta_{S,NC}$, where:

$$f_{DIFF} = f_{FFT,NC} - f_{FFT,EN} \quad \text{(Eq. 7)}$$

When $f_{FFT,NC}$ is faster than $f_{FFT,EN}$, the difference frequency is subtracted from $f_{FFT,EN}$. The resultant frequency is applied to re-sampler 414 so that EN transmitter 400 transmits at the slower FFT sample rate of the NC.

When $f_{FFT,NC}$ is slower than $f_{FFT,EN}$, the difference frequency is added to $f_{FFT,EN}$. The resultant frequency is applied to re-sampler 414 so that EN transmitter 400 transmits at the faster FFT sample rate of the NC.

In this way, the NC may recover digital signal 404 without adjustment to a receive clock domain of the NC.

A re-sampled relationship provided by re-sampler 414 is preserved through signal processing path of EN transmitter 400, including translation to a sampling rate of DAC 402. Both re-sampling at the natural OFDM FFT rate and up-sampling to the sampling rate of DAC 402 may be implemented within re-sampler 414, substantially in a single process.

The sampling rate of DAC 402 does not need to be adjusted, provided that the sampling rate of DAC 402 is above the Nyquist rate. Where re-sampler 414 operates subsequent to an FFT, the re-sampling accounts for translating the adjusted sample rate relative to the clock domain of the EN, which may be defined by either of $f_{FFT,EN}$ and the sampling rate of DAC 402, since both are generated from the same reference frequency, $f_{SYS,EN}$, and are thus synchronous with one another.

Re-sampled and up-sampled samples of digital signal 404 may be stored in a buffer prior to DAC 402. When an appropriate EN time stamp count 226 (FIGS. 2 and 3) is reached, the samples may be pulled from the buffer at the sample rate of DAC 402. Provided that the sample rate of DAC 402 is above the Nyquist rate, digital signal 404 will be properly re-constructed in the analog domain.

Re-sampler 414 may include a spectral mask filter, such as called for in one or more MoCA standards. Alternatively, a spectral mask filter may be implemented separate from re-sampler 414.

EN transmit path 400 may include a digital frequency converter 416 to frequency convert digital signal 414 in accordance with carrier frequency offset $\Delta\omega_{C,NC}$, such that the carrier frequency subsequently imparted by AFE 408 is synchronous with NC carrier frequency $f_{CH,NC}$. Digital frequency converter 416 may be configured similar to digital frequency converter 302 in FIG. 3.

Where carrier frequency offset $\Delta\omega_{C,NC}$ is determined with respect to a received signal, such as described above with respect to FIG. 3, a value or affect of carrier frequency offset $\Delta\omega_{C,NC}$ may be reversed in a transmit path. For example, where carrier frequency offset $\Delta\omega_{C,NC}$ is subtracted or removed from digitized signal 216 in FIG. 2, carrier frequency offset $\Delta\omega_{C,NC}$ may be added to digital signal 404 in FIG. 4.

Figure 5:
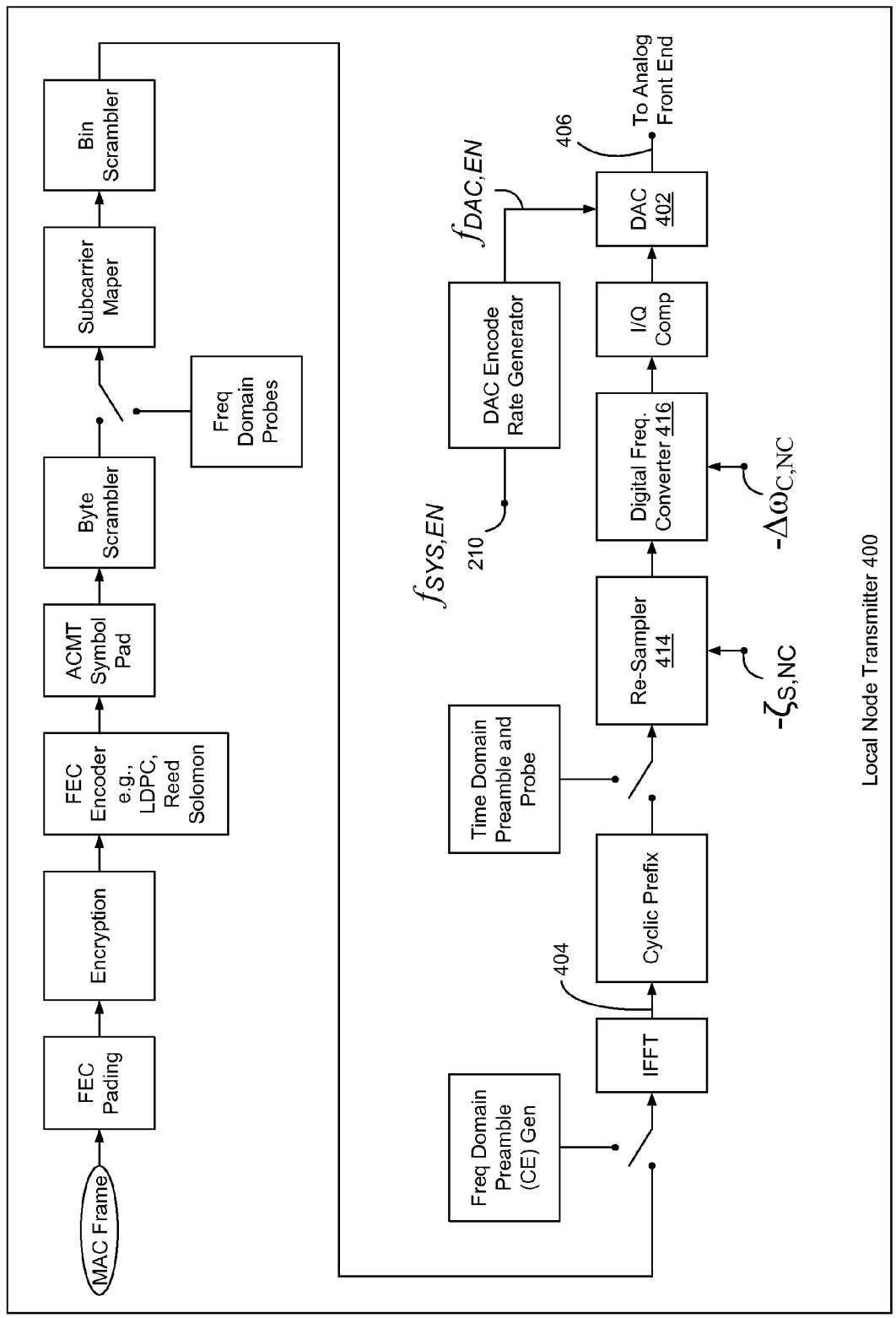
FIG. 5 is another block diagram of the EN transmitter, including additional example transmit path components, such as may be used in a MoCA environment.

FIG. 5 is another block diagram of EN transmitter 400, including additional example components, such as may be used in a MoCA environment.

Figure 6:
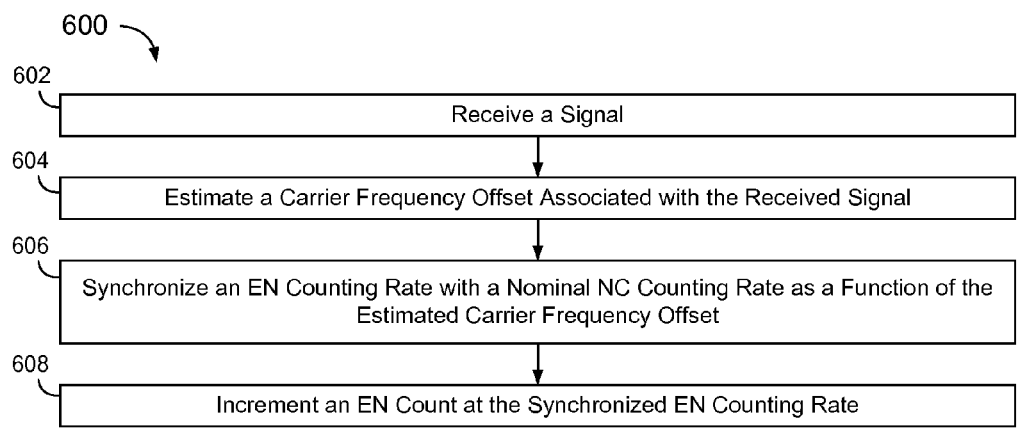
FIG. 6 is a process flowchart of a method of synchronizing a local counting rate with a remote counting rate as a function of an estimated carrier frequency offset.

FIG. 6 is a process flowchart of a method 600 of synchronizing a local counting rate with a remote counting rate. The remote counting rate may correspond to NC counting rate $f_{CR,NC}$ in FIG. 1. The local counting rate may correspond to EN counting rate $f_{CR,EN}$ in FIGS. 2 and 3. Method 600 is not, however, limited to the examples of FIG. 1, 2, or 3.

At 602, a signal is received. The signal may be received at an EN from an NC. The received signal may include a beacon or MAP, which may be formatted in accordance with one or more MoCA standards.

The receiving at 602 may include frequency down-converting the received signal using a local oscillator (LO) frequency generated from an EN system frequency. Where the LO frequency is not synchronized with a carrier frequency of the received signal, the frequency down-conversion may result in carrier frequency offset on the frequency down-converted signal.

At 604, the carrier frequency offset is estimated for the received signal. The carrier frequency offset may be estimated as described above with respect to FIG. 3.

The EN may maintain a local time stamp count to provide a reference time, such as to coordinate a scheduled task or operation with the NC. The EN time stamp count may correspond to EN time stamp count 226 in FIGS. 2 and 3. The EN time stamp count may be synchronized from time to time with a time stamp count of the NC.

The EN time stamp count may be incremented in response to an EN counting rate, which may be generated from the EN system frequency. Where the EN counting rate is not synchronized with the NC counting rate, the EN time stamp count may drift from the NC time stamp count.

At 606, the EN counting rate is synchronized with the NC counting rate as a function of the estimated carrier frequency offset. The carrier frequency may be related to the nominal NC counting rate, such as with a linear function, and the corresponding estimated carrier frequency offset may be used to synchronize the EN counting rate to the NC counting rate.

At 608, the EN count is incremented at the synchronized EN counting rate.

Figure 7:
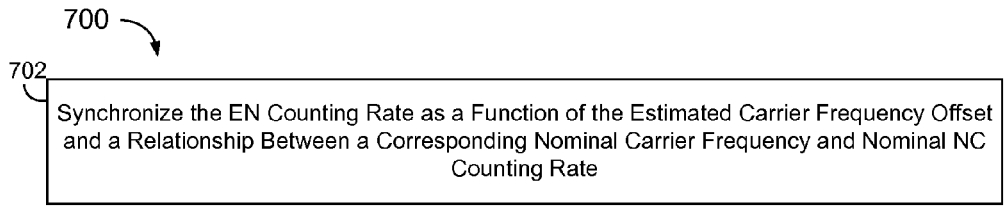
FIG. 7 is a process flowchart of a method of synchronizing the local counting rate with the remote counting rate as a function of the estimated carrier frequency offset and a relationship between a corresponding carrier frequency and the remote counting rate.

FIG. 7 is a process flowchart of a method 700 of synchronizing the EN counting rate with the NC counting rate as a function of the estimated carrier frequency offset. Method 700 may correspond to 606 in FIG. 6.

The carrier frequency and the NC counting rate may be related by a linear function, such as where carrier frequency and the NC counting rate are generated from a common reference frequency, such as a crystal oscillator.

At 702, the EN counting rate is synchronized as a function of the estimated carrier frequency offset and the relationship between the nominal NC carrier frequency and the nominal NC counting rate. The relationship may include a ratio of the nominal NC carrier frequency and the nominal NC counting rate.

Synchronization at 702 may include scaling the estimated carrier frequency offset by the relationship of the nominal carrier frequency and the nominal NC counting rate.

Figure 8:
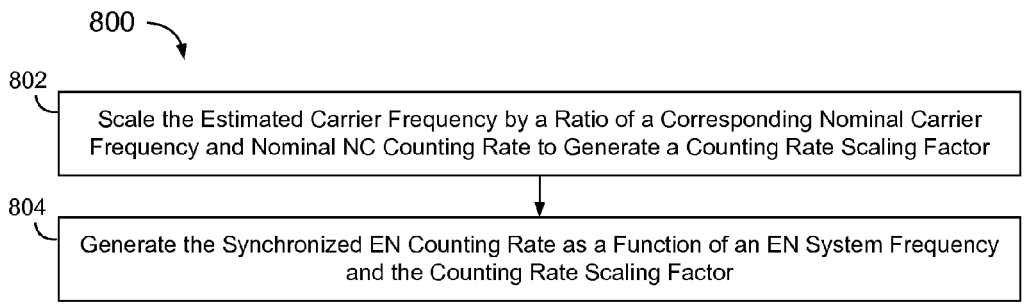
FIG. 8 is a process flowchart of a method of generating a counting rate scaling factor.

FIG. 8 is a process flowchart of another method 800 of synchronizing the EN counting rate with the NC counting rate as a function of the estimated carrier frequency offset. Method 800 may correspond to 606 in FIG. 6.

At 802, the estimated carrier frequency offset is scaled by a ratio of a corresponding carrier frequency and the nominal NC count rate to generate a counting rate compensation factor. The counting rate compensation factor may correspond to counting rate compensation factor $\zeta_{TS,NC}$ in FIGS. 2 and 3.

At 804, a synchronized EN counting rate is generated as a function of the EN system frequency and the counting rate compensation factor. An example method of generating the synchronized counting rate at 804 is disclosed below with respect to FIG. 9.

Figure 9:
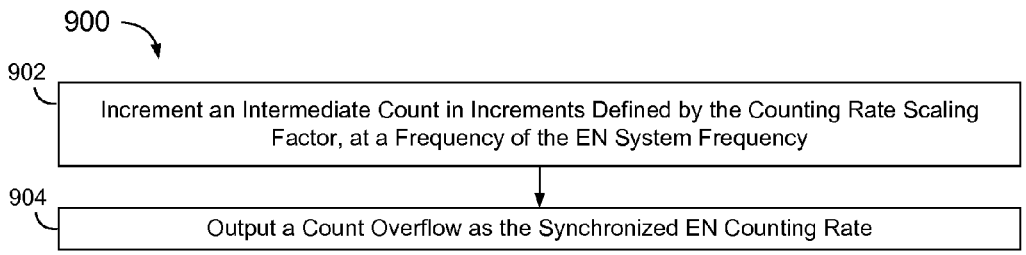
FIG. 9 is a process flowchart of a method of generating a synchronized local counting rate from the counting rate scaling factor.

FIG. 9 is a process flowchart of a method 900 of generating a synchronized EN counting rate as a function of an EN system frequency and the counting rate compensation factor. Method 900 may correspond to 804 in FIG. 8.

At 902, an intermediate count is incremented in increments defined by the counting rate compensation factor. The intermediate count may be incremented at a frequency of the EN system frequency.

At 904, a count overflow is output as the synchronized EN counting rate.

The incrementing of the intermediate count at 902, and the outputting of the overflow count at 904 may include phase accumulation.

The receiving of the signal at 602 may include digitizing the frequency down-converted signal. The digitizing may be performed with respect to a frequency of the EN system frequency, or with respect to a sampling rate generated from the EN system frequency. The digitizing may include a FFT, and the sampling rate may correspond to an FFT sampling rate. Where the digitizing is not synchronized with a symbol rate or FFT sampling rate of the received signal, the digitizing may impart a sample rate or symbol rate error to the digitized signal.

Figure 10:
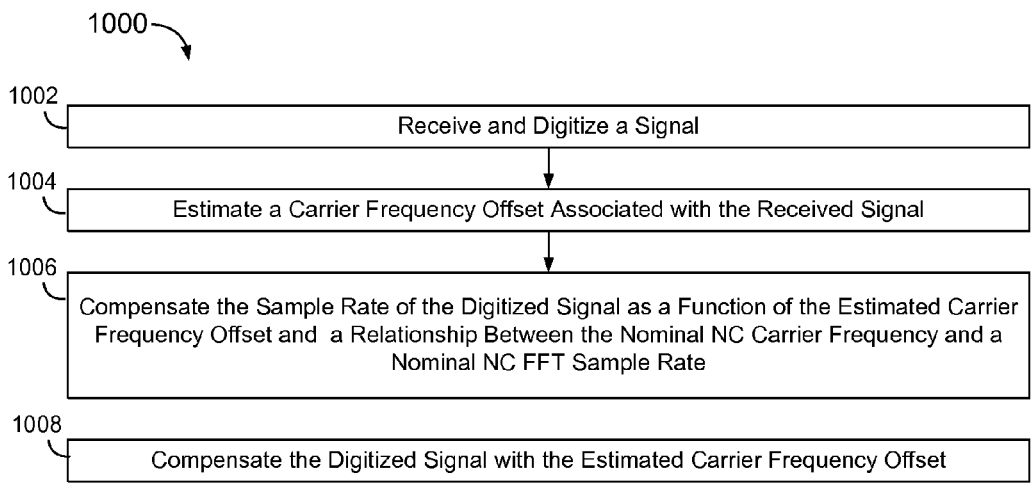
FIG. 10 is a process flowchart of a method of synchronizing a sample rate of a received signal as a function of an estimated carrier frequency offset, and of synchronizing a carrier frequency of the received signal in response to the estimated frequency offset.

FIG. 10 is a process flowchart of a method 1000 of synchronizing a sample rate of the digitized signal as a function of the estimated carrier frequency offset, and of synchronizing a frequency of the digitized signal in accordance with the estimated frequency offset.

At 1002, a signal is received, such as described above with respect to 602, and digitized.

At 1004, a carrier frequency offset is estimated for the received signal, such as described above with respect to 604.

At 1006, the FFT sample rate of the digitized signal is compensated as a function of the estimated carrier frequency offset to synchronize the FFT sample rate of the digitized signal with the FFT sample rate of a corresponding transmitting NC.

The carrier frequency may be related to the NC FFT sample rate, such as with a linear function, and the corresponding estimated carrier frequency offset may include a relationship between the EN system frequency and the NC FFT sample rate, which may be used to synchronize the FFT sample rate of the digitized signal to the NC FFT sample rate.

The compensating of the FFT sample rate at 1006 may include scaling the estimated carrier frequency offset by a ratio of the nominal carrier frequency and the nominal NC FFT sample rate to generate an FFT sample rate compensation factor, and re-sampling the digitized signal to a new FFT sample rate that is a function of the FFT sample rate compensation factor.

At 1008, a frequency of the digitized signal may be compensated by the estimated carrier frequency offset. The compensating may include digitally frequency converting the digitized signal in accordance with the estimated carrier frequency offset.

An EN transmitter may be configured to pre-compensate an IFFT sample rate of a digital signal, and/or to pre-compensate a carrier frequency of the digital signal, prior to analog conversion and frequency up-conversion of the digital signal, such as described below with respect to FIG. 11.

Figure 11:
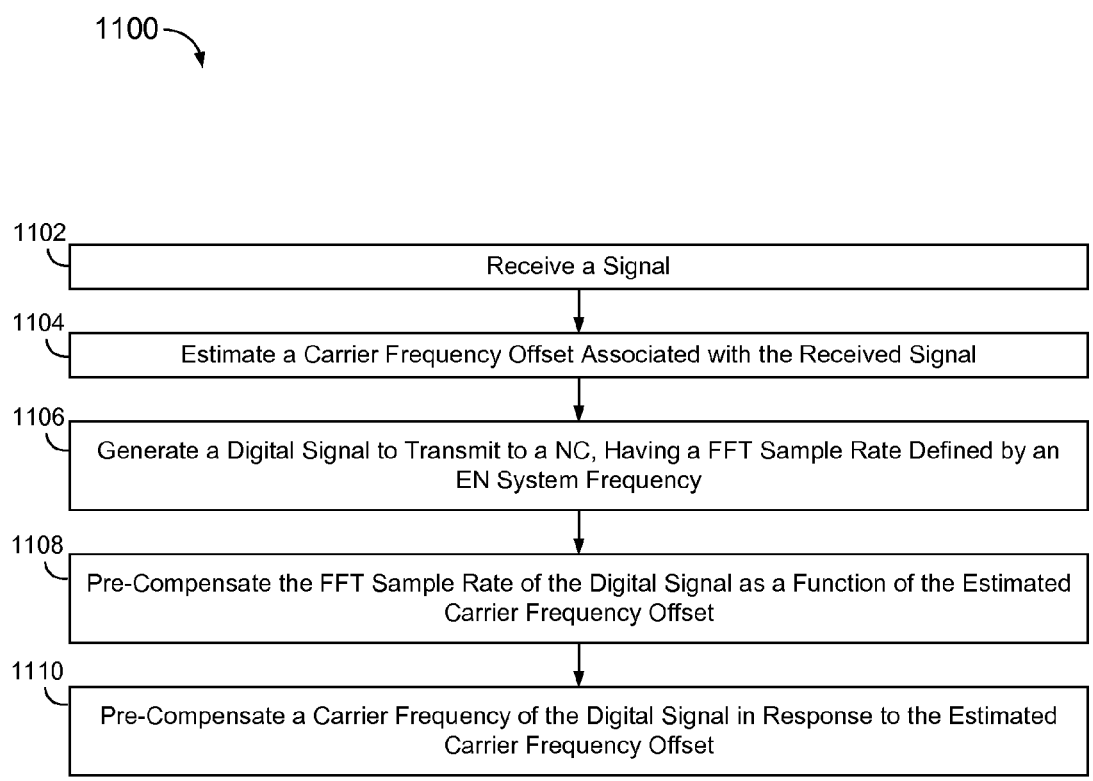
FIG. 11 is a process flowchart of a method of synchronizing a transmit symbol/IFFT sample rate as a function of an estimated carrier frequency offset of a received signal.

FIG. 11 is a process flowchart of a method 1100 of synchronizing an IFFT sample rate of a digital signal as a function of an estimated carrier frequency offset, and of synchronizing a carrier frequency of the digital signal in response to the estimated carrier frequency offset, prior to transmission.

At 1102, a signal is received from an NC, such as described above with respect to 602.

At 1104, a carrier frequency offset is estimated for the received signal, such as described above with respect to 604.

At 1106, a digital signal is generated for transmission to the NC.

At 1108, the digital signal is re-timed or re-sampled as a function of estimated carrier frequency offset, such as described above with respect to 1006, so that an IFFT sample rate imparted to the digital signal at a subsequent digital-to-analog conversion is pre-compensated such that the NC will synchronize to the transmitted EN IFFT sample rate upon application of the NC's local IFFT sample rate.

At 1110, a frequency of the digitized signal may be compensated with the estimated carrier offset frequency.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:
1. A method, comprising:
estimating a carrier frequency offset associated with a received signal;
synchronizing a local counting rate with a remote counting rate as a function of the estimated carrier frequency offset; and
incrementing a local count at the synchronized local counting rate, wherein the synchronizing includes:
synchronizing the local counting rate as a function of the estimated carrier frequency offset and a relationship between a remote carrier frequency and the remote counting rate.

2. A method, comprising:
estimating a carrier frequency offset associated with a received signal;
synchronizing a local counting rate with a remote counting rate as a function of the estimated carrier frequency offset; and
incrementing a local count at the synchronized local counting rate,
wherein the synchronizing includes:
scaling the estimated carrier frequency offset by a ratio of a remote carrier frequency and the remote counting rate to generate a counting rate compensation factor; and
generating the synchronized local counting rate as a function of a local clock signal and the counting rate compensation factor.

3. The method of claim 2, wherein the generating of the synchronized local counting rate includes:
incrementing an intermediate count in increments defined by the counting rate compensation factor, at a frequency of the local clock signal; and
outputting a count overflow as the synchronized local counting rate.

4. A method, comprising:
estimating a carrier frequency offset associated with a received signal;
synchronizing a local counting rate with a remote counting rate as a function of the estimated carrier frequency offset;
incrementing a local count at the synchronized local counting rate;
generating a digital signal having a sample rate defined by a local clock signal;
pre-compensating a sample rate of the digitized signal as a function of the estimated carrier frequency offset; and
pre-compensating a carrier frequency of the digitized signal in response to the estimated carrier frequency offset.

5. The method of claim 4, wherein the pre-compensating of the sample rate includes:
pre-compensating a Fast Fourier Transform (FFT) sample rate of the digitized signal.

6. The method of claim 5, wherein the pre-compensating of the sample rate includes:
pre-compensating the sample rate as a function of the estimated carrier frequency offset and a relationship between a remote node carrier frequency and a remote node FFT sample rate.

7. The method of claim 6, wherein the pre-compensating of the sample rate includes:
scaling the estimated carrier frequency offset by a ratio of a remote node carrier frequency and a remote node symbol rate to generate a FFT sample rate compensation factor; and
sampling the digitized signal in accordance with the FFT sample rate compensation factor.

8. A system, comprising:
a carrier recovery system to estimate a carrier frequency offset associated with a signal received from a remote node;
a local time stamp clock; and
a counting rate synchronizer to synchronize a local counting rate of the local time stamp clock with a remote node time stamp counting rate as a function of the estimated carrier frequency offset,
wherein the counting rate synchronizer is configured to synchronize the local counting rate as a function of the estimated carrier frequency offset and a relationship between the remote time stamp counting rate and a remote node carrier frequency.

9. The system of claim 8, wherein the counting rate synchronizer includes:
a frequency scaler to scale the estimated carrier frequency offset by a ratio of the remote node time stamp counting rate and the remote node carrier frequency to generate a counting rate compensation factor; and
a phase accumulator to increment an intermediate count in increments defined by the counting rate compensation factor, at a frequency of a local system clock, and to output a count overflow as a synchronized local counting rate.

10. A system, comprising:
a carrier recovery system to estimate a carrier frequency offset associated with a signal received from a remote node;
a local time stamp clock;
a counting rate synchronizer to synchronize a local counting rate of the local time stamp clock with a remote node time stamp counting rate as a function of the estimated carrier frequency offset;
a transmit path Fast Fourier Transfer (FFT) sample rate pre-compensator to pre-compensate a FFT sample rate of a digital signal as a function of the estimated carrier frequency offset; and
a transmit path digital frequency converter to pre-compensate a carrier frequency of the digital signal in response to the estimated carrier frequency offset.

11. The system of claim 10, wherein the FFT symbol rate pre-compensator is configured to pre-compensate the FFT sample rate of the digital signal as a function of the estimated carrier frequency offset and a relationship between a remote node carrier frequency and a remote node FFT sample rate.

12. A system, comprising:
a carrier recovery system to estimate a carrier frequency offset associated with a received signal; and
a transmit path Fast Fourier Transfer (FFT) sample rate pre-compensator to pre-compensate a FFT sample rate of a digital signal as a function of the estimated carrier frequency offset, wherein the FFT sample rate pre-compensator is configured to pre-compensate the FFT sample rate as a function of the estimated carrier frequency offset and a relationship between a remote node carrier frequency and a remote node FFT sample rate, and wherein the FFT sample rate pre-compensator includes:
a frequency converter to scale the estimated carrier frequency offset by a ratio of the remote node carrier frequency and the remote node FFT sample rate to generate a FFT sample rate compensation factor; and
a re-sampler to sample the digitized signal in accordance with the FFT sample rate compensation factor.

13. A system comprising:
a carrier recovery system to estimate a carrier frequency offset associated with a received signal;
a transmit path Fast Fourier Transfer (FFT) sample rate pre-compensator to pre-compensate a FFT sample rate of a digital signal as a function of the estimated carrier frequency offset;

a receive path digitizer to digitize the received signal;
a receive path FFT sample rate compensator to compensate a FFT sample rate of a digitized signal as a function of the estimated carrier frequency offset;
a receive path digital frequency converter to compensate the digitized signal in response to the estimated carrier frequency offset; and
a FFT sample rate converter to scale the estimated carrier frequency offset by a ratio of a remote node carrier frequency and a remote node FFT sample rate to generate a FFT sample rate compensation factor;
wherein the receive path FFT sample rate compensator includes a first re-sampler to sample the digitized received signal based on the FFT sample rate compensation factor; and
wherein the transmit path FFT sample rate compensator includes a second re-sampler to sample the digital signal based on the FFT sample rate compensation factor.

* * * * *